UNITED STATES PATENT OFFICE.

WILLIAM OETLINGER, OF PHILADELPHIA, PENNSYLVANIA, ASSIGNOR OF ONE-FOURTH TO WILLIAM H. MAGOFFIN, OF SAME PLACE.

PROCESS OF BATING.

SPECIFICATION forming part of Letters Patent No. 450,954, dated April 21, 1891.

Application filed June 28, 1890. Serial No. 357,144. (No specimens.)

*To all whom it may concern:*

Be it known that I, WILLIAM OETLINGER, a citizen of the United States, residing at Philadelphia, in the county of Philadelphia and State of Pennsylvania, have invented certain new and useful Improvements in Tanning Leather, of which the following is a specification.

My invention relates to improvements in the method of tanning leather, and has especial reference to the treatment of goat-skins in the bath, the object being to overcome the obnoxious stench arising from tanneries as ordinarily conducted.

The invention consists in certain novel features, which will be hereinafter first fully described, and then pointed out in the claims.

In carrying out my invention, after the skins come out of the lime, the hair taken off and fleshed, I treat them to a bath of potatoes and yeast. To make this bath I boil a proper quantity of potatoes until they are soft and then mash them fine, after which they are stirred in warm water. The skins are placed in this mixture and as much yeast as may be necessary added, the proper ratio being about one quart of yeast and one bushel of potatoes in two hundred and fifty gallons of water to five hundred skins, to ferment the whole mixture, said fermentation taking place while the skins are in the bath. The skins are allowed to remain in this bath twelve hours, and at the end of that time they will be ready for slating. After being slated the skins are again placed in the same bath and kept therein for twelve hours, being thus brought into proper condition for tanning. This treatment of the skins gives me a soft, tough, and elastic leather, and is free from all stench.

In the ordinary method the skins are treated with dog-manure, and by substituting my bath for the manure-bath I effectually overcome the stench which arises when the manure is used. Furthermore, my treatment renders the usual treatment with bran unnecessary, thus reducing the cost of the leather to a minimum. My improved method also produces a superior grade of leather, as all the hair is removed and the lime drawn from the pores.

Having thus described my invention, what I claim, and desire to secure by Letters Patent, is—

1. The improvement in the process of treating skins for tanning, which consists in subjecting them to a bath of potatoes, water, and yeast, substantially as described.

2. The improved method of treating skins, which consists in subjecting them to a bath of water, potatoes, and yeast, then slating them, and then again treating them to the bath of potatoes and yeast, as set forth.

In testimony whereof I affix my signature in the presence of two witnesses.

WILLIAM OETLINGER.

Witnesses:
JOHN F. HALBACH,
W. Q. RAYMOND.